United States Patent
Wang et al.

(10) Patent No.: US 10,786,901 B2
(45) Date of Patent: Sep. 29, 2020

(54) METHOD FOR PROGRAMMING ROBOT IN VISION BASE COORDINATE

(71) Applicant: QUANTA STORAGE INC., Taoyuan (TW)

(72) Inventors: Pei-Jui Wang, Taoyuan (TW); Chung-Hsien Huang, Taoyuan (TW); Shao-Ji Shia, Taoyuan (TW); Shih-Kuo Chen, Taoyuan (TW); Shih-Jung Huang, Taoyuan (TW)

(73) Assignee: QUANTA STORAGE INC., Taoyuan (TW)

( * ) Notice: Subject to any disclaimer, the term of this patent is extended or adjusted under 35 U.S.C. 154(b) by 356 days.

(21) Appl. No.: 15/892,456

(22) Filed: Feb. 9, 2018

(65) Prior Publication Data

US 2019/0248009 A1  Aug. 15, 2019

(51) Int. Cl.
*B25J 9/16* (2006.01)

(52) U.S. Cl.
CPC .............. *B25J 9/1656* (2013.01); *B25J 9/161* (2013.01); *B25J 9/1697* (2013.01); *Y10S 901/05* (2013.01); *Y10S 901/47* (2013.01)

(58) Field of Classification Search
CPC ........ B25J 9/1656; B25J 9/161; B25J 9/1697; B25J 9/1671; B25J 9/163; B25J 9/1664; B25J 9/1668; B25J 9/1692; B25J 15/0095; B25J 19/022; Y10S 901/05; Y10S 901/47; B33Y 50/00; G06F 40/30; G06T 7/12; A47L 2201/04; A47L 9/009; G01S 17/46; G01S 17/931; G05D 1/0246; G05D 2201/0215
See application file for complete search history.

(56) References Cited

U.S. PATENT DOCUMENTS

| | | | | |
|---|---|---|---|---|
| 9,188,973 | B2 * | 11/2015 | Tenney | G06T 7/12 |
| 9,862,096 | B2 * | 1/2018 | Sivich | B25J 9/1687 |
| 9,919,428 | B2 * | 3/2018 | Anducas Aregall | B25J 19/022 |
| 10,112,303 | B2 * | 10/2018 | Vakanski | B25J 9/1664 |
| 10,434,655 | B2 * | 10/2019 | Suzuki | B25J 9/1692 |

(Continued)

OTHER PUBLICATIONS

Feriancik et al., Using machine vision to control pointing device, 2011, IEEE, p. 469-471 (Year: 2011).*

(Continued)

*Primary Examiner* — McDieunel Marc
(74) *Attorney, Agent, or Firm* — McClure, Qualey & Rodack, LLP

(57) ABSTRACT

A method for programming a robot in a vision base coordinate is provided. The method includes the following steps. A robot is drawn to an operation point. The coordinates of the operation point in a photo operation are set as a new point. A teaching image is captured and a vision base coordinate system is established. A new point is added according to the newly established vision base coordinate system. When the robot is operating, the robot is controlled to capture an image from a photo operation point. A comparison between the captured image and a teaching image is made. The image being the same as the teaching image is searched according to the comparison result. Whether the vision base coordinate system maintains the same corresponding relation as in the teaching process is checked. Thus, the robot can be precisely controlled.

8 Claims, 10 Drawing Sheets

(56) References Cited

U.S. PATENT DOCUMENTS

| | | | | |
|---|---|---|---|---|
| 10,556,347 B2* | 2/2020 | Akeel | ............... | B25J 9/163 |
| 2018/0259544 A1* | 9/2018 | Machiraju | ............... | G06F 40/30 |
| 2018/0354130 A1* | 12/2018 | Preisinger | ............... | B25J 9/1664 |
| 2019/0071261 A1* | 3/2019 | Wertenberger | ............... | B25J 9/1697 |
| 2019/0243338 A1* | 8/2019 | Golway | ............... | B33Y 50/00 |
| 2019/0248009 A1* | 8/2019 | Wang | ............... | B25J 9/1697 |
| 2019/0322384 A1* | 10/2019 | Bosworth | ............... | B25J 15/0095 |
| 2020/0030979 A1* | 1/2020 | Bank | ............... | B25J 9/1671 |

OTHER PUBLICATIONS

Malheiros et al., Robust and real-time teaching of industrial robots for mass customisation manufacturing using stereoscopic vision, 2009, IEEE, p. 2336-2341 (Year: 2009).*

Ahm et al., An off-line automatic teaching by vision information for robotic assembly task, 2000, IEEE, p. 2171-2176 (Year: 2000).*

Li et al., Novel industrial robot sorting technology based on machine vision, 2017, IEEE, p. 902-907 (Year: 2017).*

Narvaez et al., Vision based autonomous docking of VTOL UAV using a mobile robot manipulator, 2017, IEEE, p. 157-163 (Year: 2017).*

Shu et al., Precise online camera calibration in a robot navigating vision system, 2005, IEEE, p. 1277-1282 (Year: 2005).*

Edwards et al., Photo-realistic Terrain Modeling and Visualization for Mars Exploration Rover Science Operations, 2005, Internet, p. 1-7 (Year: 2005).*

Sanchez et al., Robot-arm pick and place behavior programming system using visual perception, 2000, IEEE, p. 507-510 (Year: 2000).*

* cited by examiner

METHOD FOR PROGRAMMING ROBOT IN VISION BASE COORDINATE

BACKGROUND OF THE INVENTION

Field of the Invention

The invention relates in general to a robot, and more particularly to an industrial robot establishing a vision base coordinate system by capturing images and a method for programming operation points of the robot.

Description of the Related Art

The robot, having the features of flexible movement, precise positioning accuracy and continuous operation, has become a powerful tool in the production line for assembling products. How to simplify the programming process of the robot operation so that the robot can quickly join the production line has become an essential issue to increase the production efficiency of the robot.

As indicated in FIG. 10, the coordinate system for programming the robot 1 according to the prior art normally includes a robot base coordinate system R, a global base coordinate system G, a tool base coordinate system T, and a workpiece base coordinate system W. Of the above coordinate systems, the workpiece base coordinate system W is particularly important. During the programming process, the robot 1 can selectively record the operation point P, which moves at different stages, on the workpiece base coordinate system W of a workpiece 2. The 6 degrees of freedom composed of the coordinates of the original point and the 3D azimuths recorded on the workpiece base coordinate system W vary with respect to the robot base coordinate system R, so that the robot 1 can confirm relative position of the operation point P on the robot base coordinate system R according to the variation of the operation point P on the workpiece base coordinate system W with respect to the robot base coordinate system R. Then, the robot 1 can be precisely controlled and move to the operation point P. Since the coordinates of the operation point P are recorded according to the workpiece base coordinate system W and do not vary with the movement in the robot base coordinate system R, the operation point P does not change on the human-machine interface. Therefore, the operation point can be easily set for the operation programming of the robot 1.

Besides, the terminal end or exterior of the robot 1 is normally integrated with a vision device 3. Through the captured images of the vision device 3, the robot 1 calculates the coordinates of the image characteristics D on the image plane and then compares the coordinates of the image characteristics D on the image plane with the coordinates of the known environmental characteristics D of the working environment to generate a coordinate offset of the image characteristics D. For example, X-axis: 3 pixels; Y-axis: 6 pixels; angle: 0.5°. Based on the said offset, the pixels can be converted into actual distance, such as 6 mm and 12 mm, through image processing. When programming the set points, the user can compensate the said offset, such that the movement of the robot 1 can be calibrated with the images, and control accuracy of the robot can be increased.

However, according to the above programming method, the set points need to be compensated one by one along with the captured images, making point setting very complicated and difficult. Furthermore, after the set points are compensated according to the captured images of the vision device 3 several times, the programming and recording of the points will become even more complicated and difficult to understand, the programming of the robot 1 will become extremely difficult, the set points will be difficult to manage, the points requiring precise calculation can hardly be used repeatedly, and the programming efficiency will deteriorate accordingly. For example, a point is offset to a captured image L along with the captured image K, and then is again offset to a captured image M along with the captured image L. Therefore, how to make the robot having an image system programmed more easily in an intuitive manner has become a prominent task for the industries.

SUMMARY OF THE INVENTION

According to one embodiment of the present invention, a method for programming a robot in a vision base coordinate is provided. Through a teaching image captured by the vision device of the robot at an operation point, a vision base coordinate system is established, and the operation point is programmed according to the vision base coordinate system to simplify the operation programming of the robot.

According to another embodiment of the present invention, a method for programming a robot in a vision base coordinate is provided. After the programming process is completed, the robot is controlled to search for the image being the same as the teaching image, confirm the vision base coordinate system, and quickly move to an operation point, so that the efficiency of robot operation can be increased.

According to an alternate embodiment of the present invention, a method for programming a robot in a vision base coordinate is provided. The coordinate system selected during the programming process of an operation point is provided by a human-machine interface, the coordinate system of the operation point is marked in a process block, and the coordinates of the operation point are registered in the point management page, such that the management of operation points can be enhanced.

To achieve the above embodiments of the present invention, the method for programming a robot in a vision base coordinate includes the following steps. A robot is drawn to an operation point. The coordinate system for recording the operation point is selected. The operation point is set as a new point, and the coordinate and operation of the new point are set. If it is determined that the operation at the new point is a photo operation, then a teaching image is captured at the new operation point and a vision base coordinate system is established. If it is determined that the programming process is not completed, then a follow-up new point is set on the established vision base coordinate system. If it is determined that the programming process is completed, the programming method terminates. If it is determined that the operation at the new point is not the photo operation, the method directly checks whether the programming process is completed.

After the programming process is completed, the method for programming a robot in a vision base coordinate of the present invention further includes the following steps: The robot is moved to an operation point according to the selected coordinate system. If it is determined that the operation at the operation point is a photo operation, the robot is controlled to capture an image and compare the captured image with a teaching image, and the displacement of image and the difference amount in rotation angle are calculated according to the comparison result to search for the image being the same as the teaching image. Whether the difference amount between the captured image and the teaching image is less than a predetermined value is checked. Whether the vision base coordinate system is maintained at the same corresponding relation as in the teaching process is checked, so that the movement of the robot can be precisely controlled.

If it is determined that the difference amount is not less than a predetermined value, the method continues to search for the image being the same as the teaching image. After the vision base coordinate system is confirmed, the capturing posture is recorded, a new vision base coordinate system is established, and the vision base coordinate system is updated according to the newly established coordinate system. After the vision base coordinate system is updated, if it is determined that the operation is not completed, the method continues to move to an operation point; if it is determined that the operation is completed, the operation terminates. If it is determined that the operation point is not the photo operation, the operation set at the operation point is performed, and whether the operation is completed is checked. According to the method for programming a robot in a vision base coordinate, after the coordinate and operation of the new point are set, the mark recording the vision base coordinate system is shown in the subscript of a process block of the new point on a programming frame of the human-machine interface of the robot.

The above and other aspects of the invention will become better understood with regard to the following detailed description of the preferred but non-limiting embodiment(s). The following description is made with reference to the accompanying drawings.

DETAILED DESCRIPTION OF THE INVENTION

The technical methods adopted to achieve the above embodiments of the present invention and the consequent effects are disclosed in a number of preferred embodiments below with reference to the accompanying drawings.

Figure 1:
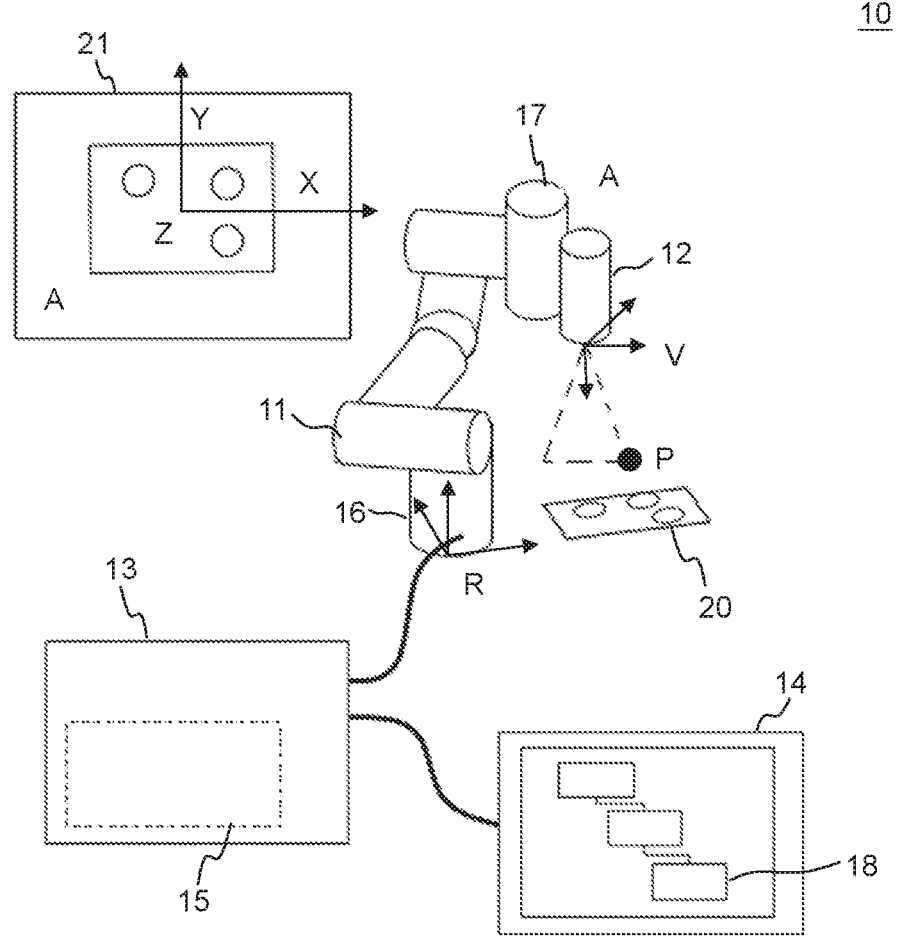
FIG. 1 is a schematic diagram of a system for programming a robot in a vision base coordinate according to the present invention.
Figure 2:
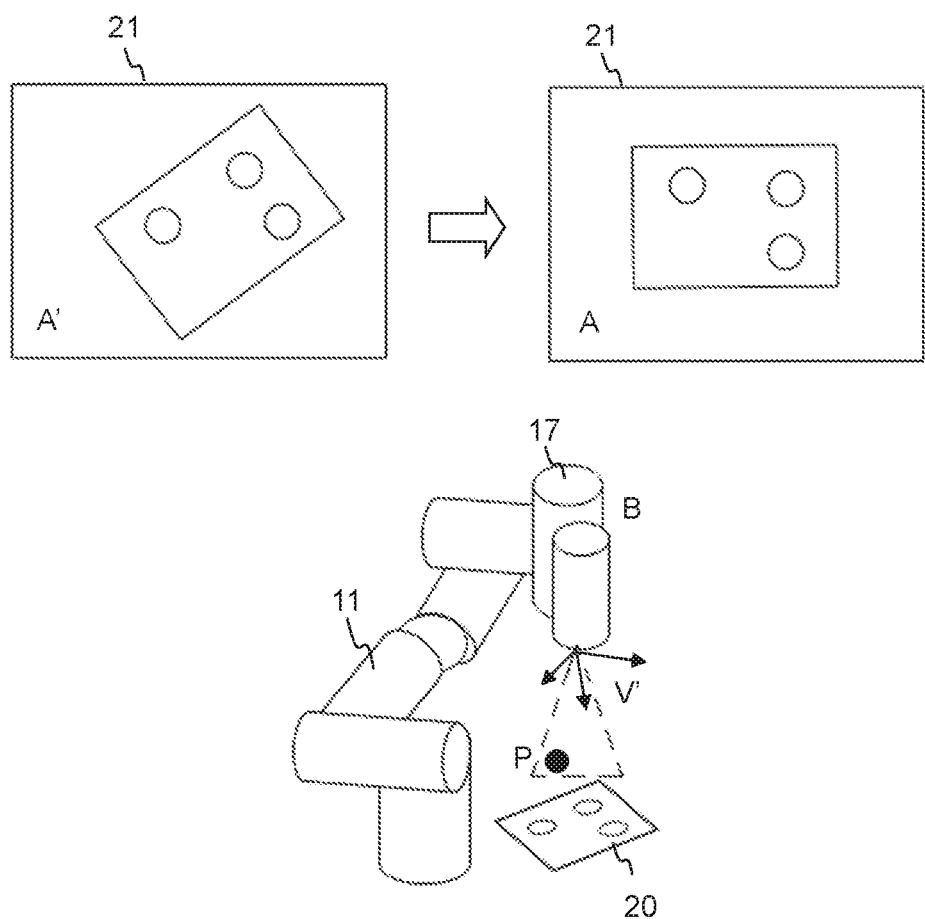
FIG. 2 is a schematic diagram of a robot of the present invention establishing a vision base coordinate system during programming operation.
Figure 3:
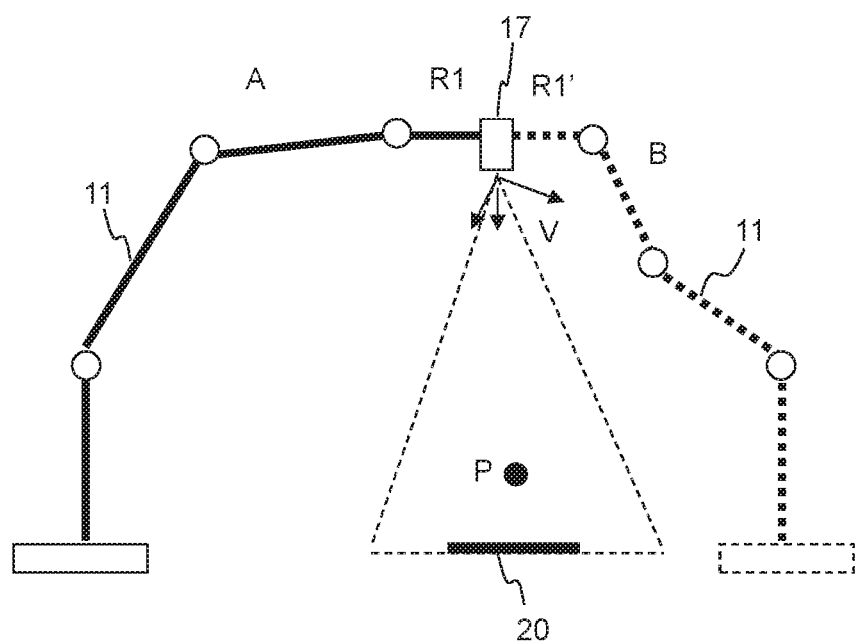
FIG. 3 is a schematic diagram of a vision base coordinate system of a robot according to the present invention.

Refer to FIG. 1, FIG. 2 and FIG. 3. FIG. 1 is a schematic diagram of a system for programming a robot in a vision base coordinate according to the present invention. FIG. 2 is a schematic diagram of a robot establishing a vision base coordinate system during programming operation according to the present invention. FIG. 3 is a schematic diagram of a vision base coordinate system of a robot according to the present invention. As indicated in FIG. 1, the programming system 10 of the present invention mainly includes a robot 11, a vision device 12, a controller 13, a human-machine interface 14 and a storage device 15. A robot base coordinate system R is formed at a fixed end 16 of the robot 11. The vision device 12 is disposed at a flexible end 17 of the robot 11. The robot 11 is connected to the controller 13. The user programs an operation process 18 of the robot 11 through the human-machine interface 14 connected to the controller 13 and then inputs the programmed operation process 18 to the storage device 15 of the controller 13. The controller 13 controls the robot 11 to move according to the programming process. The robot 11 further captures an image 21 of the workpiece 20 by using the vision device 12 disposed at the flexible end 17 to store the capturing posture and the captured image 21 in the storage device 15 of the controller 13. The controller 13 performs image processing to the image 21 stored in the storage device 15. Since the vision device 12 is fixed at the flexible end 17 of the robot 11, the controller 13, based on the rotation relation between the servo motors disposed at each joint through the capturing posture, can obtain and record the coordinates of the flexible end 17 on the robot base coordinate system R as well as the relation of the vision base coordinate system V for the vision device 12 under each capturing posture with respect to the robot base coordinate system R.

In the present invention, relative position of the workpiece 20 on the vision base coordinate system V of the robot 11 is detected by a servo-vision method. During the programming process of teaching the robot 11 to operate, the robot 11 is drawn to capture a teaching image A of the workpiece 20 by using the vision device 12 at a capturing posture A. A vision base coordinate system V is established according to the position of the vision device 12, such that the original point of the vision base coordinate system V overlaps the original point of the planar coordinate system of the teaching image A, and the XYZ axes of the vision base coordinate system V also overlap the XYZ axes of the planar coordinate system of the teaching image A. That is, the vision base coordinate system V is established according to the 6 dimensional relative relation of the vision device 12 with respect to the robot base coordinate system R. Then, the established vision base coordinate system V is stored in the storage device 15 of the robot 11. There are many methods for establishing the vision base coordinate system by capturing images using the vision device 12 disposed at the flexible end 17 of the robot 11. The present invention includes the method exemplified above, but is not limited thereto. Then, the robot 11 is drawn to the operation point P at which the workpiece 20 is processed, and the coordinates of the operation point P are recorded according to the established vision base coordinate system V. Relative position between the operation point P and the workpiece 20 is fixed and a relative relation exists between the workpiece 20 and the flexible end 17 of the robot 11. However, since the distance of the workpiece 20 is unknown, the coordinates of the workpiece 20 on the vision base coordinate system V cannot be obtained.

Referring to FIG. 2, a schematic diagram of a robot of the present invention establishing a vision base coordinate system during programming operation is shown. During the operation, when the workpiece 20 is conveyed or when the robot 11 is displaced, relative displacement will be generated between the robot 11 and the workpiece 20, and the vision base coordinate system V during teaching cannot be maintained. Firstly, the robot 11 captures an image A' of the workpiece 20 at the same capturing posture A. There is an azimuth difference between the image A' and the teaching image A. A comparison of image planar features between the teaching image A and the captured image A' is made. The displacement of image and the difference amount in rotation angle are calculated according to the comparison result. Then, the robot 11 is controlled to move and continue to capture an image of the workpiece 20 and search for the image until the captured image is the same with the teaching image A or the difference between the captured image and the teaching image A is less than a predetermined threshold. Then, vision control is completed and the posture B at which the robot 11 completes vision control is recorded.

Refer to FIG. 3. When vision control is completed and the captured image is the same as the teaching image, this indicates that the flexible end 17 of the robot 11, the operation point P, and the workpiece 20 maintain the same relative position as in the teaching process. Then, a new vision base coordinate system V' is established according to the posture B at which vision control is completed. The new vision base coordinate system V' is equivalent to the 6D coordinate R1' of the vision device 12 of the robot 11 at the posture B on the robot base coordinate system R. Given that the vision base coordinate system V is known during the teaching process, the stored description values of the vision base coordinate system V with respect to the robot base coordinate system R can be updated according to the new vision base coordinate system V'. The workpiece 20 maintains the same corresponding point on the vision base coordinate system V, and only the coordinates of the flexible end 17 of the robot 11 on the vision base coordinate system V change with respect to the coordinates of the robot base coordinate system R. Therefore, after update is completed, the coordinates of the workpiece 20 do not need to be positioned, and the flexible end 17 of the robot 11 can be quickly moved to the operation point P set on the vision base coordinate system V to process the workpiece 20.

Figure 4:
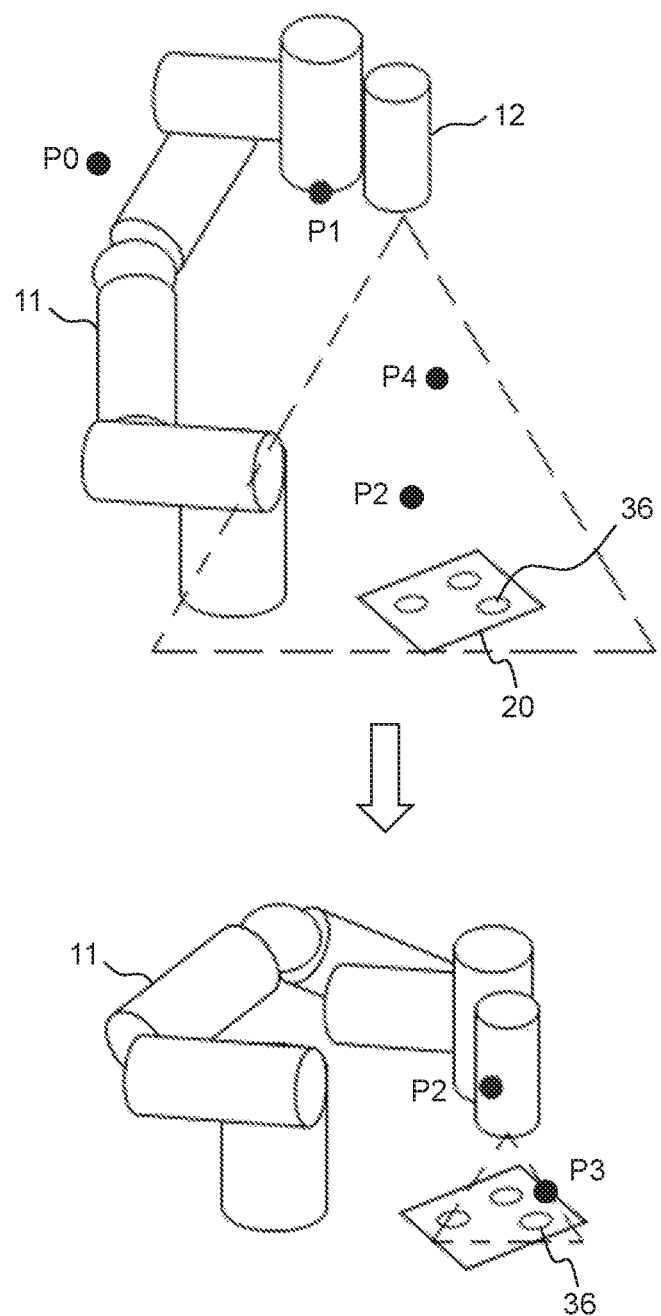
FIG. 4 is a schematic diagram of a robot of the present invention moving to a point.
Figure 5:
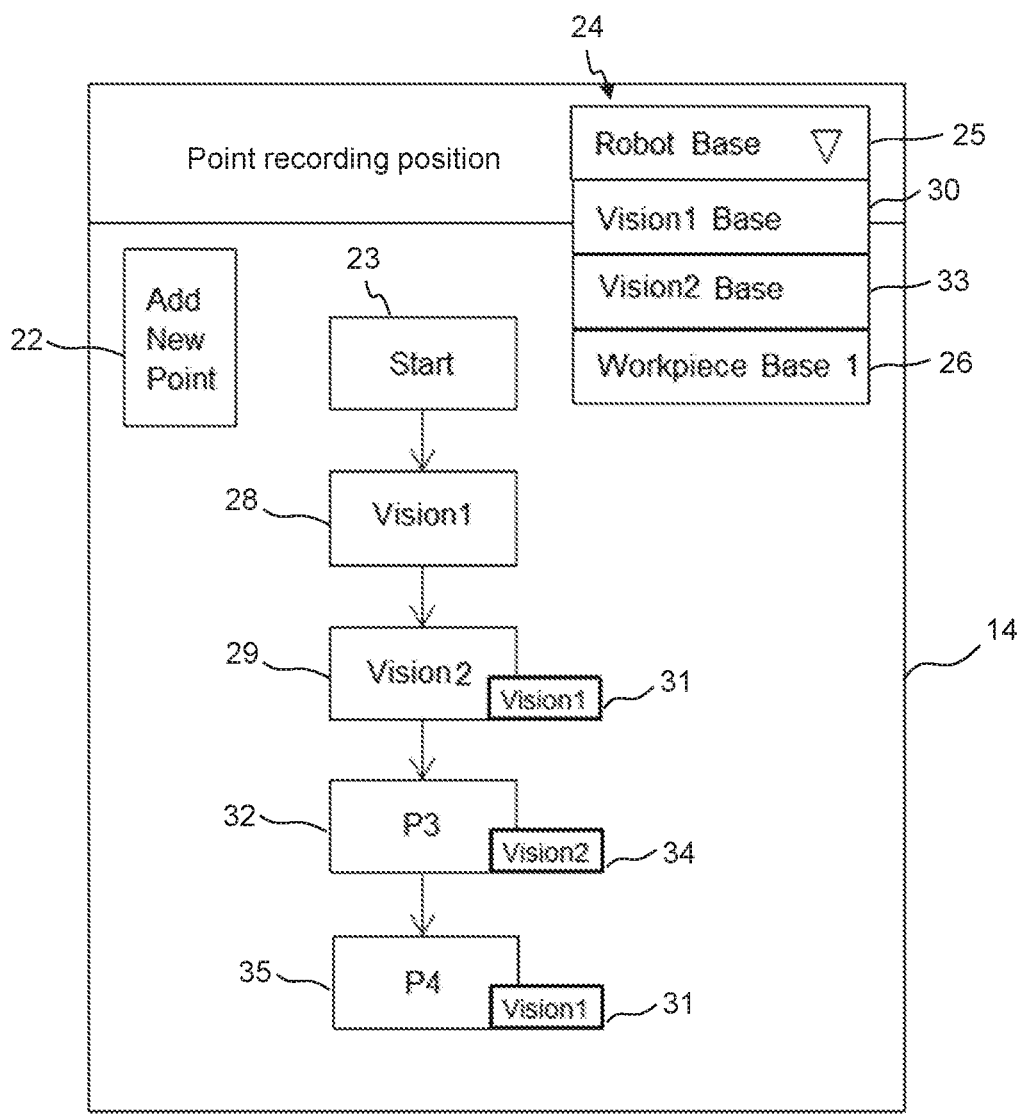
FIG. 5 is a schematic diagram of a programming frame of a human-machine interface of the present invention.
Figure 6:
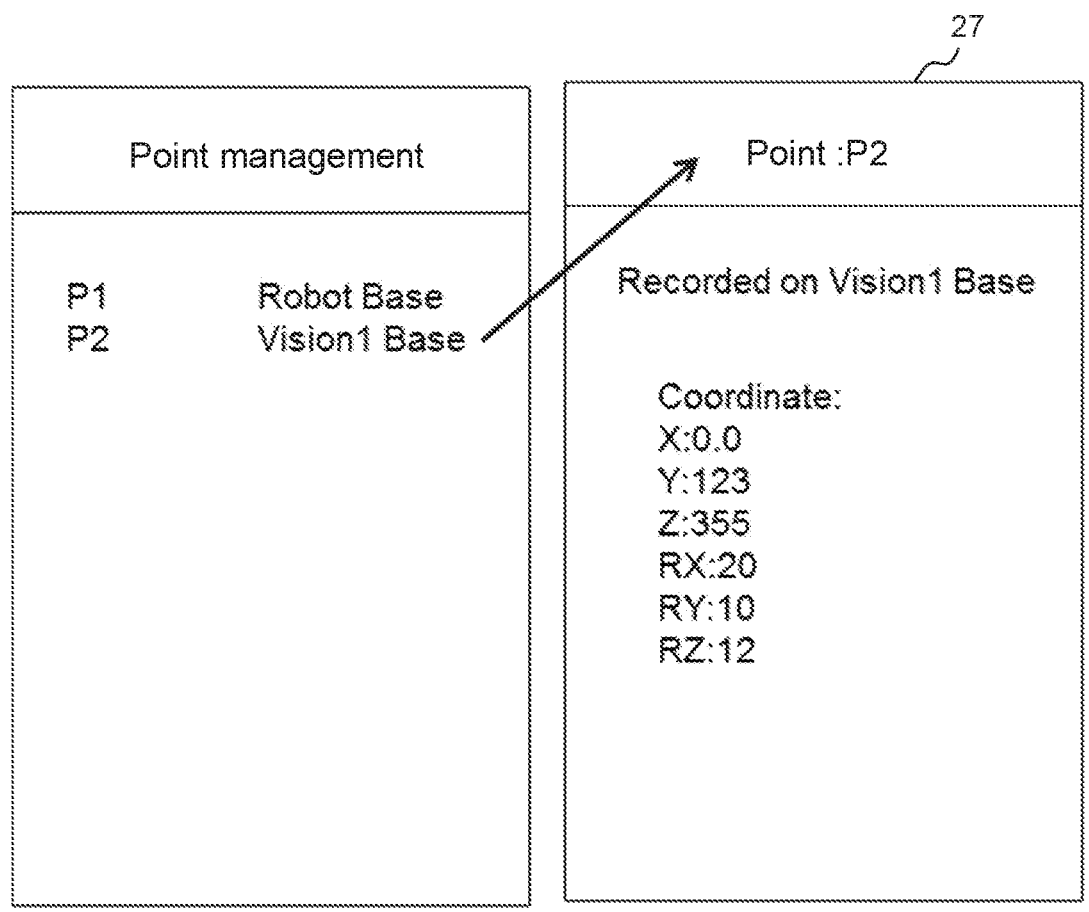
FIG. 6 is a schematic diagram of point recording frames of the present invention.

Refer to FIG. 4 to FIG. 6. FIG. 4 is a schematic diagram of a robot of the present invention moving to a point. FIG. 5 is a schematic diagram of a programming frame of a human-machine interface of the present invention. FIG. 6 is a schematic diagram of point recording frames of the present invention. As indicated in FIG. 4, the robot 11 uses the vision device 12 to capture an image of the workpiece 20 from a first operation point P1 far away from the workpiece 20. Then, the robot 11 checks the approximate point of the workpiece 20 and moves to a second operation point P2 closer to the workpiece 20 to capture an image of the object 36 placed at a certain position of the workpiece 20 at a near distance. Since the object 36 occupies a large volume of pixels on the image plane of the vision device 12, the azimuth of the object 36 is more precisely determined. Then, the robot 11 moves to a third operation point P3 to clamp the object 36 of the workpiece 20 and then moves to a fourth operation point P4 at a farther distance. Then, the object 36 is placed at another position of coordinate and operation of the workpiece 20.

Refer to FIG. 5. The human-machine interface 14 of the present invention is used for programming the above operation process. Firstly, an initial operation point P0 is programmed. Then, the robot 11 is drawn to the initial point P0, the point recording position 24 on the human-machine interface 14 is scrolled down, and a coordinate system set at the point is selected. The coordinate system items shown at the point recording position 24 normally include a Robot Base item 25 (indicating the robot base coordinate system) and some useful coordinate system items reserved in the teaching process. For example, at the beginning of the programming process, only the Robot Base item 25 and a Workpiece Base item 26 (indicating the workpiece base coordinate system) are available for selection, and the Robot Base item 25 is selected. When the add-new-point key 22 on the frame of the human-machine interface 14 is pressed, the frame of the human-machine interface 14 shows a process block 23, and the robot 11 automatically inputs the coordinates of the initial point P0 of the robot base coordinate system. When the process block 23 is pressed, a point recording frame 27 (referring to FIG. 5) is shown. The coordinate and operation of the initial point P0 are checked and set, and the process block 23 is stored as an initial block.

Return to the frame of FIG. 4 for programming the robot at a first operation point P1. The robot 11 is drawn to the first operation point P1 at a farther distance, the point recording position 24 is scrolled down, and the Robot Base item 25 is selected. When the add-new-point key 22 on the human-machine interface 14 is again pressed, the frame shows a process block 28, and the robot 11 automatically inputs the coordinates of the first operation point P1 of the robot base coordinate system R. When the process block 28 on the human-machine interface 14 is pressed, the point recording frame 27 is shown (referring to FIG. 5), the setting is checked and the process block 28 is stored as a first photo block. Then, the robot 11 captures a first teaching image of the workpiece 20 from the first operation point P1 at a farther distance, and the first vision base coordinate system V1 is established according to the first teaching image and stored in the storage device of the robot 11.

Return to the frame of FIG. 4 for programming the robot at a second operation point P2. The robot 11 is drawn to the second operation point P2 at a near distance, the point recording position 24 is scrolled down, and a Vision1 Base item 30 (indicating the newly established first vision base coordinate system V1) is selected. When the add-new-point key 22 on the human-machine interface 14 is pressed, the frame shows a process block 29, and the robot 11 automatically inputs the coordinates of the second operation point P2 of the first vision base coordinate system V1. When the process block 29 on the human-machine interface 14 is pressed, the point recording frame 27 is shown (referring to FIG. 5), the setting is checked, and the process block 29 is stored as a second photo block. In the process block 29, the coordinates of the points are recorded according to the first vision base coordinate system V1, the subscript of the process block 29 shows a Vision1 mark 31 (indicating the first vision base coordinate system V1) to remind the user that the marked coordinate system is different from the unmarked coordinate system (the robot base coordinate system R). Then, the robot 11 captures a second teaching image of the workpiece 20 from the second operation point P2 at a near distance, and the second vision base coordinate system V2 is established according to the second teaching image and stored in the storage device of the robot 11.

Return to the frame of FIG. 4 for programming the robot at a third operation point P3. A second teaching image of an object 36 on the workpiece 20 is captured at a near distance, and a clamping point is considered. The robot 11 is drawn to the third operation point P3 of the clamping point to clamp the object 36, the point recording position 24 is scrolled down, and a Vision2 Base item 33 (indicating the newly established second vision base coordinate system V2) is selected. When the add-new-point key 22 on the human-machine interface 14 is pressed, the frame shows a the process block 32, and the robot 11 automatically inputs the coordinates of the third operation point P3 of the second vision base coordinate system V2. When the process block 32 on the human-machine interface 14 is pressed, the point recording frame 27 is shown (referring to FIG. 5), the setting is checked and the process block 32 is stored as the third operation point P3 for the clamping operation, and the subscript of the process block 32 shows a Vision2 mark 34 (indicating the second vision base coordinate system V2).

Then, return to the frame of FIG. 4 for programming the robot at a fourth operation point P4. The robot 11 clamping the object 36 is drawn to the fourth operation point P4 of the placing point, the point recording position 24 is scrolled down, and the Vision1 Base item 30 is selected. When the add-new-point key 22 on the human-machine interface 14 is pressed, the frame shows a process block 35, and the robot 11 automatically inputs the coordinates of the fourth operation point P4 of the first vision base coordinate system V1. When the process block 35 of the human-machine interface 14 is pressed, the point recording frame 27 is shown (referring to FIG. 5), the setting is checked, the process block 35 is stored as the fourth operation point P4 of the placing operation, and the subscript of the process block 35 shows a Vision1 mark 31 (indicating the first vision base coordinate system V1). Thus, the programming of the clamping and placing operation of the robot 11 is completed.

During the actual operation after the programming process is completed, the robot 11 starts to be moved to a first operation point P1 from the initial point P0 according to the robot base coordinate system. An image of the workpiece 20 is captured from the first operation point P1 at a farther distance according to the setting at the first photo operation point. A comparison between the captured image and a first teaching image is made. The displacement of image and the difference amount in rotation angle are calculated according to the comparison result. The robot 11 is controlled to search for the image being the same as the first teaching image. A new first vision base coordinate system V1' is established. Relative positions between the robot 11 and the workpiece 20 at the first operation point P1 are confirmed. Then, the robot 11 is moved to a second operation point P2. An image of the workpiece 20 is captured from the second operation point P2 at a near distance according to the setting at a second photo operation point of the second operation point P2. A comparison between the captured image and a second teaching image is made. The displacement of image and the difference amount in rotation angle are calculated according to the comparison result. The robot 11 is controlled to search for the captured image being the same as the second teaching image. A new second vision base coordinate system V2' is established. Relative positions between the robot 11 and the object 36 on the workpiece 20 at the second operation point P2 are confirmed. Then, the robot 11 is moved to a third operation point P3. The object 36 is clamped according to the setting of the clamping operation at the third operation point P3. Then, the robot 11 is moved to a fourth operation point P4 of the new first vision base coordinate system V1'. The object 36 is placed at the same point on the workpiece 20 as in the teaching process according to the setting of the placing operation at the fourth operation point P4. Thus, the pick-and-place operation of the workpiece 20 whose relative position with respect to the robot changes when the operation starts.

The robot can be directly programmed at above points on different vision base coordinate systems without employing complicated calculation. Although the coordinates of the points are recorded on different vision base coordinate systems, the programming system already records the calibrated data on each vision base coordinate system with respect to the robot base coordinate system when each vision base coordinate system is established. Therefore, by converting point coordinates of the vision base coordinate system into point coordinates of the robot base coordinate system, the robot can be controlled to move to the fourth point from the first point to pick-and-place the workpiece.

Figure 7:
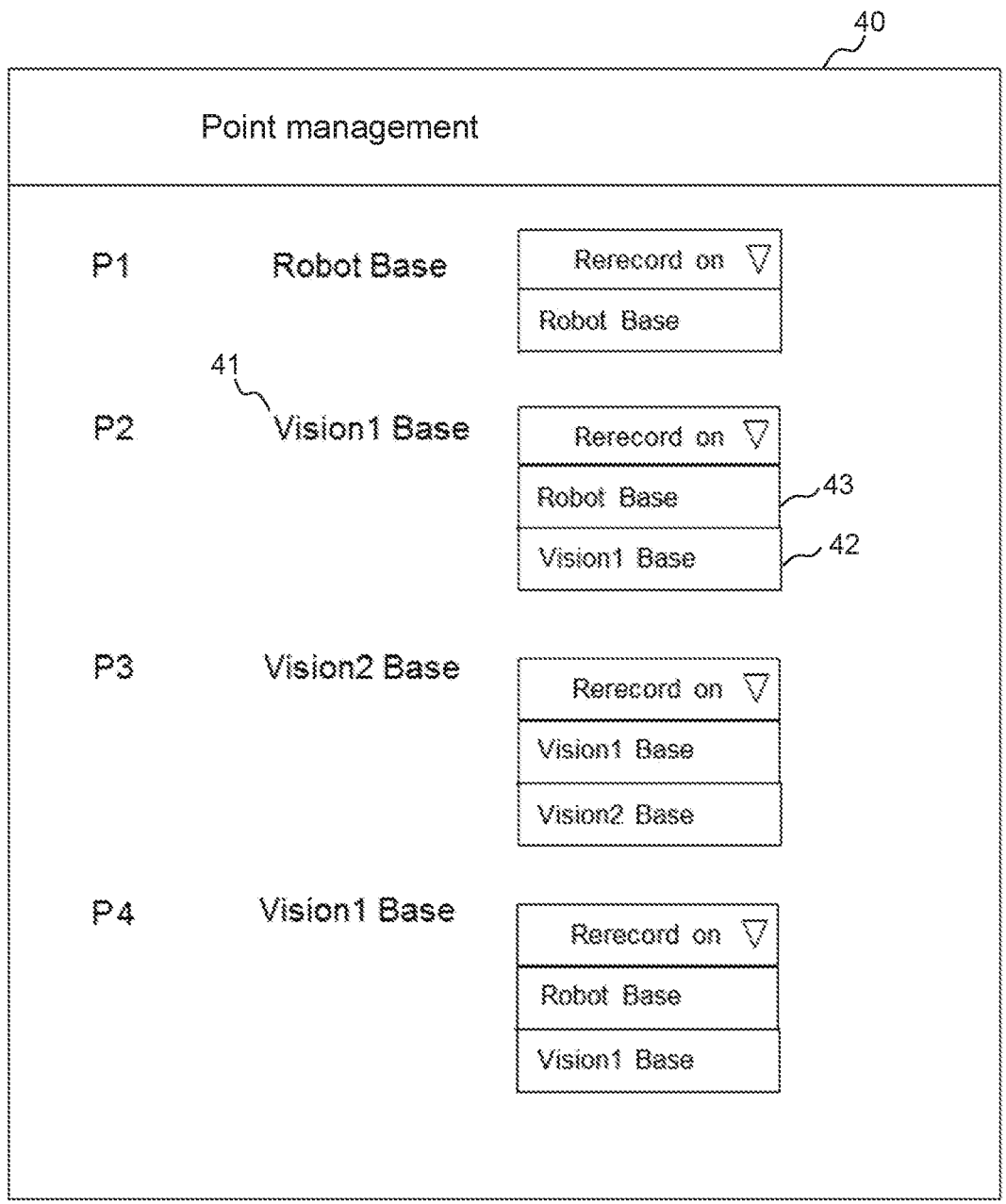
FIG. 7 is a point management frame of the present invention.

As indicated in FIG. 7, a point management frame of the present invention is shown. The point management frame 40 of the present invention records the coordinate system 41 of each point. The point management frame 40 further includes a method for converting the coordinate system of each point on a point storage management interface. When the user chooses to record a point on other coordinate system, the robot controller maintains the description values of the point on the original coordinate system 42, and calculates and records the coordinates of the point on the new coordinate system 43 selected by the user. Thus, the point calculated by the user can be maintained and does not need to be calculated again when the point is recorded on a wrong coordinate system and therefore is deleted or edited.

Figure 8:
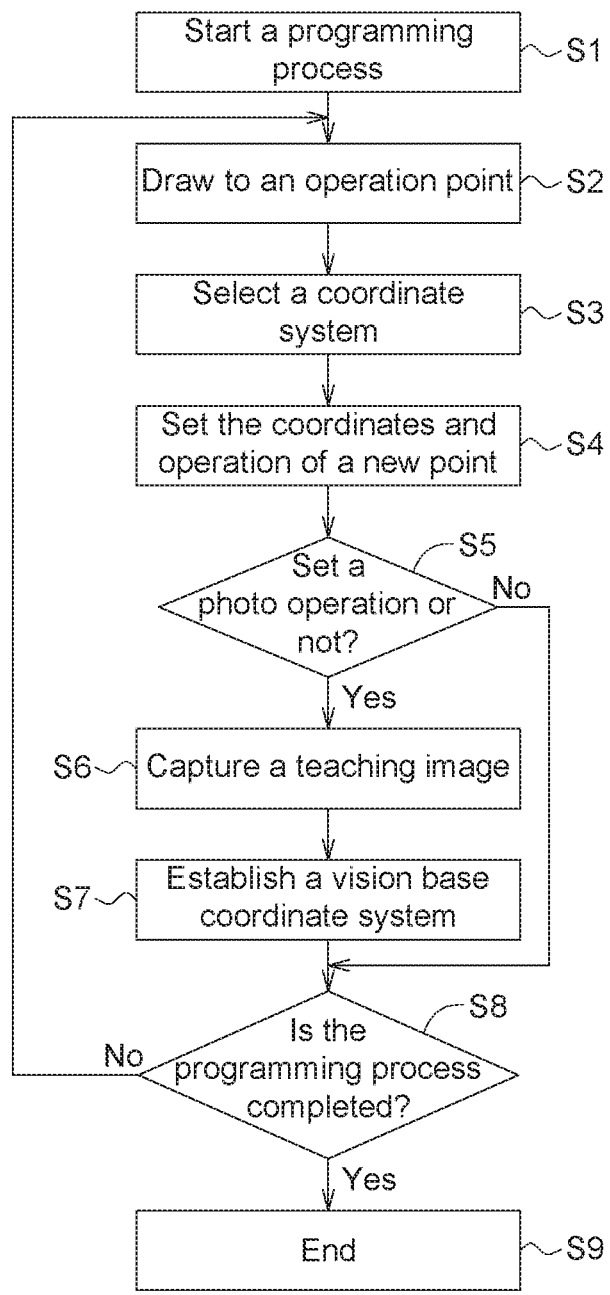
FIG. 8 is a flowchart of a method for programming a robot in a vision base coordinate according to the present invention.

As indicated in FIG. 8, a flowchart of a method for programming a robot in a vision coordinate according to the present invention is shown. As disclosed in above embodiments, the method for programming a robot in a vision coordinate includes following steps. Firstly, the method begins at step S1, a programming process starts. In step S2, the robot is drawn to an operation point. In step S3, a coordinate system for recording the operation point is selected. In step S4, the operation point is set as a new point, and the coordinates and operation of the new point are set. In step S5, whether the operation at the new point is a photo operation is checked. If it is determined that the operation at the new point is the photo operation, the method proceeds to step S6, a teaching image is captured at the new point. In step S7, a vision base coordinate system is established at the new point. In step S8, whether the programming process is completed is checked. If it is determined that the programming process is not completed, the method returns to step S2 to provide the established vision base coordinate system and continue to establish a new point. If it is determined that the programming process is completed, the method proceeds to step S9 to terminate the programming process. In step S5, if it is determined that the operation at the new point is not the photo operation, the method directly proceeds to step S8 to check whether the programming process is completed.

Figure 9:
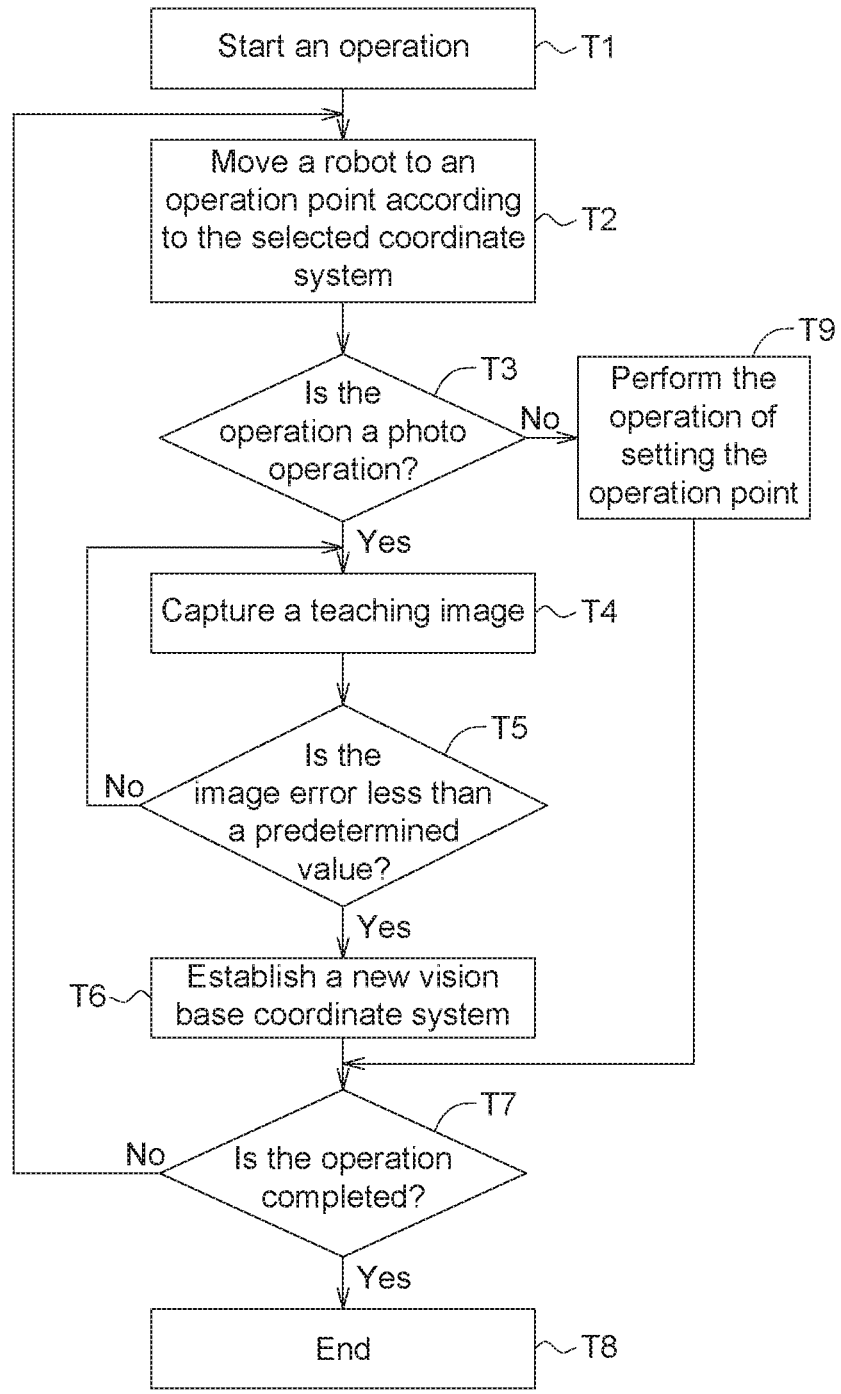
FIG. 9 is a flowchart of a method for operating a programmed robot according to the present invention.
Figure 10:
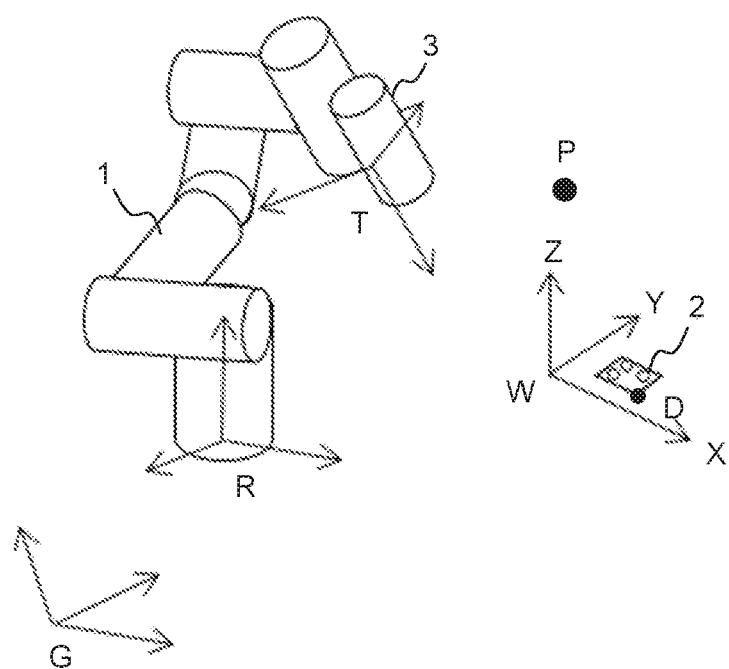
FIG. 10 (prior art) is a schematic diagram of coordinate systems for programming a robot according to the prior art.

As indicated in FIG. 9, a flowchart of a method for operating a programmed robot according to the present invention is shown. As disclosed in above embodiments, detailed descriptions of the method for operating a programmed robot are disclosed below. Firstly, the method begins at step T1, the method for operating a programmed robot starts. In step T2, a robot is moved to the operation point according to the selected coordinate system. In step T3, whether the operation at the operation point is a photo operation is checked. If it is determined that the operation at the operation point is the photo operation, the method proceeds to step T4, the robot is controlled to capture an image, compares the captured image with a teaching image, calculates the displacement of image and the difference amount in rotation angle according to the comparison result, and searches for the image being the same as the teaching image. In step T5, whether the difference amount between the captured image and the teaching image is less than a predetermined value is checked. If it is determined that the difference amount is not less than predetermined value, the method returns to step T4 to search for the image being the same as the teaching image. If it is determined that the difference amount is less than the predetermined value, the method proceeds to step T6, whether the vision base coordinate system maintains the same corresponding relation as in the teaching process is confirmed so that the robot can be precisely controlled, the capturing posture is recorded, a new vision base coordinate system is established, and the vision base coordinate system is updated according to the new vision base coordinate system. In step T7, whether the operation is completed is checked. If it is determined that the operation is not completed, the method returns to step T2 to move the robot to the operation point. If it is determined that the operation is completed, the method proceeds to step T8 to terminate the operation. In step T3, if it is determined that the operation point is not the photo operation, the method directly proceeds to step T9 to perform the operation of setting the operation point and then proceeds to step T7 to check whether the operation is completed.

According to the method for programming a robot in a vision coordinate of the present invention, the robot uses a vision device to capture a teaching image, a vision base coordinate system is established according to the teaching image, and the operation point is directly programmed on the vision base coordinate system, such that the programming of the robot can be simplified. After the robot is programmed, the robot is controlled to capture an image and search for the image being the same as the teaching image, the vision base coordinate system is confirmed and the robot is quickly moved to a designated point, so that the operation efficiency of the robot can be increased. Besides, the method for programming a robot in a vision coordinate the present invention can switch the operations points between the established vision base coordinate systems, so that the images or points can be repeatedly used across the vision base coordinate systems, the image capturing or processing time can be reduced, and the programming efficiency can be increased. Moreover, when programming an operation point, the method for programming a robot in a vision coordinate of the present invention allows the user to select a stored coordinate system through the human-machine interface, and marks the coordinate system of each operation point in the process block, and registers the coordinates of each operation point on the point management page to enhance the management of operation points for the user's reference.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for programming a robot in a vision base coordinate, comprising:
    drawing a robot to an operation point;
    selecting a coordinate system recorded at the operation point;
    setting the operation point as a new point, and setting coordinates and operation of the new point;
    checking whether the operation at the new point is a photo operation;
    capturing a teaching image at the new point and establishing a vision base coordinate system; and
    setting a follow-up point on the established vision base coordinate system;
    after the programming process is completed, the programming method further comprises:
    moving the robot to the operation point according to the selected coordinate system;
    checking whether the operation at the operation point is the photo operation;
    controlling the robot to capture an image, comparing the captured image with the teaching image and calculating a displacement of image and a difference amount in rotation angle according to the comparison result to search for an image being the same as the teaching image;
    checking whether the difference amount between the captured image and the teaching image is less than a predetermined value;
    checking whether the vision base coordinate system maintains the same corresponding relation as in the teaching process, so that the movement of the robot can be precisely controlled.

2. The method for programming a robot in a vision base coordinate according to claim 1, wherein after the vision base coordinate system is established, if it is determined that the programming process is not completed, the method continues to add a new point; if it is determined that the programming process is completed, the programming process terminates.

3. The method for programming a robot in a vision base coordinate according to claim 2, wherein if it is determined that the operation at the new point is not a photo operation, the method directly checks whether the programming process is completed.

4. The method for programming a robot in a vision base coordinate according to claim 1, wherein if it is determined that the difference amount is not less than the predetermined value, the method continues to search for an image being the same as the teaching image.

5. The method for programming a robot in a vision base coordinate according to claim 1, wherein after the vision base coordinate system is confirmed, the capturing posture is recorded, a new vision base coordinate system is established, and the vision base coordinate system is updated according to the newly established vision base coordinate system.

6. The method for programming a robot in a vision base coordinate according to claim 5, wherein after the vision base coordinate system is updated, if it is determined that the operation is not completed, the method continues to move the robot to a point; if it is determined that the operation is completed, the method terminates.

7. The method for programming a robot in a vision base coordinate according to claim 6, wherein if it is determined that the operation at the operation point is not the photo operation, the operation set at the operation point is performed and whether the operation is completed is checked.

8. The method for programming a robot in a vision base coordinate according to claim 1, wherein after the coordinates and operation of the new point are set, a mark indicating the vision base coordinate system is shown in a subscript of a process block of the new point on a programming frame of a human-machine interface of the robot.

* * * * *